(12) United States Patent
Boban

(10) Patent No.: US 9,502,830 B2
(45) Date of Patent: Nov. 22, 2016

(54) MULTIMEDIA FACEPLATES HAVING ETHERNET CONVERSION CIRCUITRY

(71) Applicant: CommScope, Inc. of North Carolina, Hickory, NC (US)

(72) Inventor: Benji Boban, Garland, TX (US)

(73) Assignee: CommScope, Inc. of North Carolina, Hickory, NC (US)

( * ) Notice: Subject to any disclaimer, the term of this patent is extended or adjusted under 35 U.S.C. 154(b) by 0 days.

(21) Appl. No.: 14/881,390

(22) Filed: Oct. 13, 2015

(65) Prior Publication Data
US 2016/0164229 A1    Jun. 9, 2016

Related U.S. Application Data

(60) Provisional application No. 62/086,767, filed on Dec. 3, 2014.

(51) Int. Cl.
| H01R 13/66 | (2006.01) |
| H01R 24/64 | (2011.01) |
| H01R 27/02 | (2006.01) |

(52) U.S. Cl.
CPC ............ *H01R 13/665* (2013.01); *H01R 24/64* (2013.01); *H01R 27/02* (2013.01)

(58) Field of Classification Search
CPC .................................................... H01R 13/665
See application file for complete search history.

(56) References Cited

U.S. PATENT DOCUMENTS

| 6,487,214 | B1 * | 11/2002 | Bachar | H04L 12/413 370/217 |
| 6,640,308 | B1 * | 10/2003 | Keyghobad | G05B 19/042 370/254 |
| 6,643,566 | B1 * | 11/2003 | Lehr | G06F 1/26 700/286 |
| 6,697,372 | B1 * | 2/2004 | McAlear | H04L 12/46 370/402 |
| 6,813,651 | B1 * | 11/2004 | Smith | G06F 13/385 710/20 |
| 6,977,939 | B2 * | 12/2005 | Joy | H04L 12/4633 370/401 |
| 7,046,983 | B2 * | 5/2006 | Elkayam | G06F 1/26 379/402 |
| 7,221,261 | B1 * | 5/2007 | Klingensmith | H04L 12/10 340/12.32 |
| 7,565,211 | B2 * | 7/2009 | Caveney | H04B 3/44 700/75 |
| 7,835,295 | B2 * | 11/2010 | Brewer | H04L 12/10 370/252 |
| 8,064,179 | B2 * | 11/2011 | Apfel | H04L 12/10 361/90 |

(Continued)

*Primary Examiner* — Ross Gushi
(74) *Attorney, Agent, or Firm* — Merchant & Gould P.C.

(57) ABSTRACT

A multimedia faceplate includes a frame having a front face and a rear face and at least one connector mounting aperture therein, a non-Ethernet connector mounted in the connector mounting aperture, an Ethernet conversion unit that is electrically connected to the non-Ethernet connector and a plurality of wire connection contacts that are electrically connected to the Ethernet conversion unit. The Ethernet conversion unit is configured to draw an electrical power signal from either an AC to DC power conversion unit or from a Power-over-Ethernet power signal received from an Ethernet cable that is connected to the wire connection contacts.

20 Claims, 3 Drawing Sheets

(56) References Cited

U.S. PATENT DOCUMENTS

| | | | | |
|---|---|---|---|---|
| 8,132,035 B2* | 3/2012 | Juillerat | G06F 1/266 | 340/538 |
| 8,379,654 B2* | 2/2013 | Stone | G06F 13/4022 | 370/401 |
| 8,432,142 B2* | 4/2013 | Vorenkamp | G06F 1/266 | 323/266 |
| 8,537,814 B2* | 9/2013 | Phillips | H04L 63/02 | 370/359 |
| 8,595,550 B1* | 11/2013 | Heath | G06F 11/2015 | 714/14 |
| 8,693,482 B2* | 4/2014 | Ozugur | H04L 12/2832 | 370/401 |
| 8,725,905 B2* | 5/2014 | Terry | H04L 12/10 | 370/389 |
| 9,176,555 B2* | 11/2015 | Choo | G06F 1/263 | |
| 9,203,628 B2* | 12/2015 | Hunter, Jr. | H04L 12/10 | |
| 2002/0037004 A1 | 3/2002 | Bossemeyer | H04L 12/6418 | 370/356 |
| 2003/0099076 A1* | 5/2003 | Elkayam | G06F 1/26 | 361/90 |
| 2004/0090984 A1* | 5/2004 | Saint-Hilaire | H04L 12/4633 | 370/463 |
| 2004/0136373 A1* | 7/2004 | Bareis | H04L 12/2801 | 370/392 |
| 2004/0151168 A1* | 8/2004 | Phillips | H04L 63/02 | 370/359 |
| 2004/0164619 A1* | 8/2004 | Parker | H04L 12/10 | 307/80 |
| 2004/0230846 A1* | 11/2004 | Mancey | H04L 12/10 | 713/300 |
| 2005/0080516 A1* | 4/2005 | Pincu | G06F 1/263 | 700/297 |
| 2005/0136989 A1* | 6/2005 | Dove | G06F 1/266 | 455/572 |
| 2005/0201306 A1* | 9/2005 | Engel | H04L 12/10 | 370/299 |
| 2006/0053324 A1* | 3/2006 | Giat | H04L 12/10 | 713/300 |
| 2006/0089230 A1* | 4/2006 | Biederman | H04L 12/10 | 477/34 |
| 2006/0165097 A1* | 7/2006 | Caveney | H04B 3/44 | 370/395.53 |
| 2006/0215680 A1* | 9/2006 | Camagna | H04L 12/12 | 370/419 |
| 2006/0251179 A1* | 11/2006 | Ghoshal | H04L 25/0266 | 375/257 |
| 2007/0019560 A1* | 1/2007 | Brewer | H04L 12/10 | 370/252 |
| 2007/0057783 A1* | 3/2007 | Reller | G05B 19/042 | 340/538 |
| 2007/0081553 A1* | 4/2007 | Cicchetti | H04L 12/10 | 370/466 |
| 2008/0159304 A1* | 7/2008 | Ozugur | H04L 12/2832 | 370/401 |
| 2008/0231111 A1 | 9/2008 | Hazani et al. | | |
| 2008/0264667 A1 | 10/2008 | Dinh | | |
| 2008/0285444 A1* | 11/2008 | Diab | H04L 12/2805 | 370/230.1 |
| 2008/0288704 A1* | 11/2008 | Diab | H04L 12/2805 | 710/305 |
| 2009/0248918 A1* | 10/2009 | Diab | G06F 13/385 | 710/51 |
| 2012/0319468 A1* | 12/2012 | Schneider | H04N 7/185 | 307/1 |
| 2013/0301745 A1* | 11/2013 | Maniktala | H04B 3/56 | 375/258 |
| 2014/0094059 A1* | 4/2014 | Pepe | H01R 13/6658 | 439/540.1 |
| 2014/0115354 A1* | 4/2014 | Jabbaz | H04L 12/10 | 713/310 |
| 2014/0269350 A1* | 9/2014 | Dearing | H04B 3/56 | 370/248 |
| 2015/0331464 A1* | 11/2015 | Balasubramanian | G06F 13/387 | 713/310 |
| 2015/0331821 A1* | 11/2015 | Liston | G06F 13/387 | 710/106 |
| 2015/0334186 A1* | 11/2015 | Chen | H04L 67/12 | 348/143 |
| 2016/0064938 A1* | 3/2016 | Balasubramanian | H02J 4/00 | 307/11 |
| 2016/0164229 A1* | 6/2016 | Boban | H01R 13/665 | 439/620.22 |

* cited by examiner

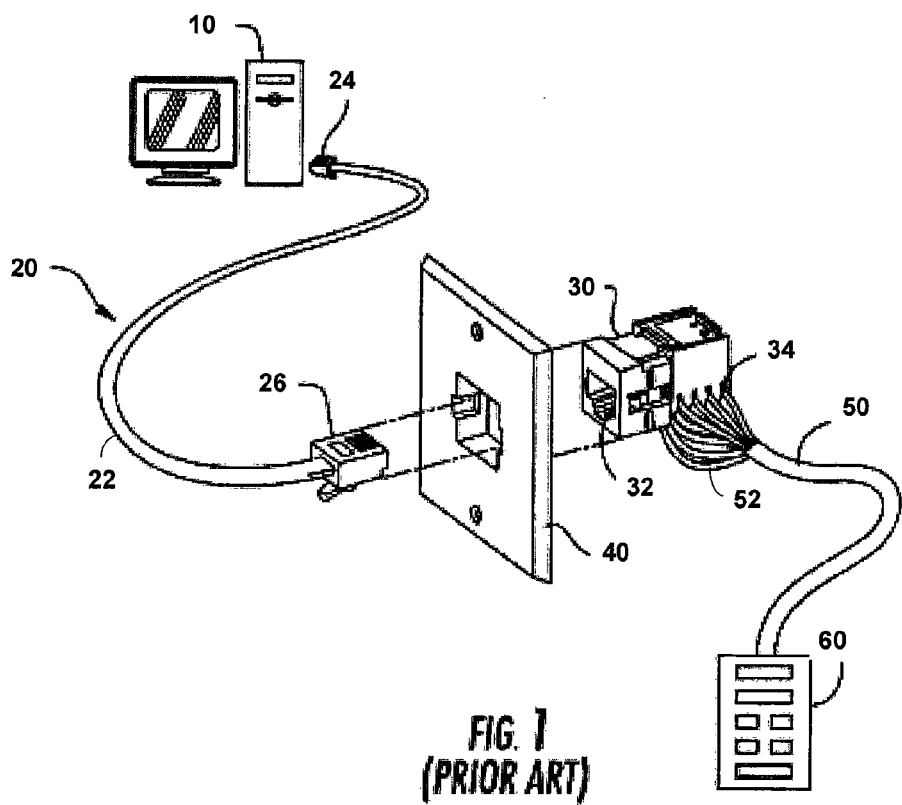
FIG. 1
(PRIOR ART)
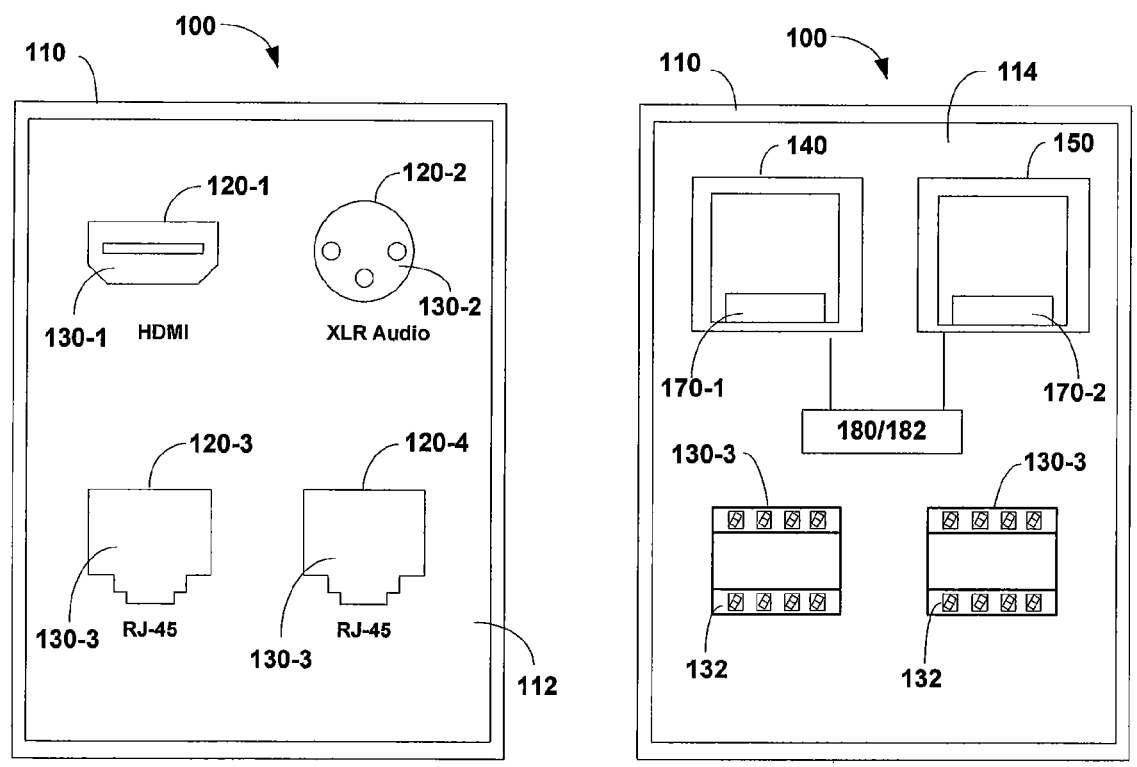
FIG. 2A  FIG. 2B

1

MULTIMEDIA FACEPLATES HAVING ETHERNET CONVERSION CIRCUITRY

CROSS-REFERENCE TO RELATED APPLICATION

The present application claims priority under 35 U.S.C. §119 to U.S. Provisional Patent Application Ser. No. 62/086,767, filed Dec. 3, 2014, the entire content of which is incorporated herein by reference as if set forth in its entirety.

FIELD OF THE INVENTION

The present invention relates generally to wired communications systems and, more particularly, to faceplates that include communications connectors that are used in wired communications systems.

BACKGROUND

As the use of networked computers and other electronic devices has proliferated over the last twenty-five years, buildings are now routinely "wired" with communications cables that are used to interconnect various electronic devices within the building and/or to provide communications connectivity to external communications networks such as, for example, the Internet. As one example, most office buildings, schools and homes are routinely wired with so-called Ethernet cabling. Herein, the term "Ethernet cabling" refers to any communications cabling that has at least four twisted pairs of insulated conductors, specifically including unshielded and shielded cabling that is compliant with the Category 5, 5e, 6, 6A, 7 or higher industry standards for communications cabling, including both unterminated cables and cables that are terminated with connectors such as RJ-45 plugs (such terminated cables are typically referred to as "patch cords").

In a typical installation, wall boxes (which are also referred to as "gang boxes" or "receptacles") are mounted in the walls of various roams of a building, and one or more RJ-45 jacks are mounted in a faceplate that covers the wall box. RJ-45 plugs and jacks are well-known types of male and female connectors that are used to connect two Ethernet cables. Ethernet cables are routed from a central location such as a computer room, a telecommunications closet or the like through the walls and/or ceiling of the building to each RJ-45 jack. Patch cords may then be used to connect electronic devices to these RJ-45 jacks to allow the electronic devices to communicate with each other, with network equipment and/or with electronic devices in external networks via network switches, routers and/or other network equipment that is provided at the central location.

FIG. 1 illustrates a typical connection where RJ-45 plugs and jacks and Ethernet cabling are used to connect an electronic device such as a computer 10 to network equipment such as a network switch 60 that is located in a remote location. As shown in FIG. 1, the computer 10 is connected by a patch cord 20 to an RJ-45 jack 30 that is mounted in a wall plate 40 that covers a wall receptacle (not shown). The patch cord 20 comprises a communications cable 22 that contains four twisted pairs of insulated conductors and RJ-45 plugs 24, 26 that are attached to the respective ends of the cable 22. The RJ-45 plug 24 is inserted into an RJ-45 jack (not shown) that is provided in the computer 10, and the RJ-45 plug 26 is inserted into a plug aperture 32 in the front side of the RJ-45 jack 30. The RJ-45 jack 30 includes a back-end wire connection assembly 34 that receives and holds the eight conductors 52 of an Ethernet cable 50 that is terminated into the back-end wire connection assembly 34. Each conductor 52 of cable 50 is individually pressed into a respective one of a plurality of slots provided in the back-end wire connection assembly 34 to establish mechanical and electrical connection between each conductor 52 of cable 50 and the RJ-45 jack 30. The other end of each conductor 52 in cable 50 may be connected to, for example, a network switch 60.

While many buildings are only wired with Ethernet cabling, in some cases it is necessary to provide communications cabling for other types of equipment such as, for example, HDMI, VGA, SDI and/or S-Video cabling for audio/video or video signals (e.g., television, DVR, etc.) or XLR ¼" audio or ⅛" audio ports (balanced or unbalanced, stereo or mono) for audio signals. For example, schools may be wired with audio/video cabling to allow close-circuit television signals to be distributed from a central location to the classrooms and/or with audio cabling so that announcements may be made at a central location and output through speakers in each classroom.

SUMMARY

Pursuant to embodiments of the present invention, multimedia faceplates are provided that include a frame having front and rear faces and at least one connector mounting aperture therein, a non-Ethernet connector mounted in the connector mounting aperture, an Ethernet conversion unit that is electrically connected to the non-Ethernet connector, and a plurality of wire connection contacts that are electrically connected to the Ethernet conversion unit. The Ethernet conversion unit is configured to draw an electrical power signal from either an AC to DC power conversion unit or from a Power-over-Ethernet power signal received from an Ethernet cable that is connected to the wire connection contacts.

In some embodiments, the multimedia faceplate may further include a printed circuit board, and the Ethernet conversion unit and/or the wire connection contacts may be mounted on the printed circuit board. The printed circuit board may be mounted on at least one of the frame, the non-Ethernet connector, or another connector that is mounted in a second mounting aperture in the frame. In other embodiments, the Ethernet conversion unit may be mounted directly on the non-Ethernet connector. The Ethernet conversion unit may be configured to convert a multimedia signal into a signal that can directly drive a multimedia output device.

In some embodiments, the Ethernet conversion unit may be configured to convert a video signal or an audio/video signal into a signal having a packet-based video-over-Ethernet protocol. In other embodiments, the Ethernet conversion unit may be configured to convert an audio signal into a signal having a packet-based audio-over-Ethernet protocol.

In some embodiments, the multimedia faceplate may further include an Ethernet connector mounted in a second connector mounting aperture in the frame. The Ethernet conversion unit may be configured to convert a multimedia signal into a signal that can be routed by an Ethernet switch. The Ethernet conversion unit may also be configured to convert a packet-based video-over-Ethernet protocol into a video signal or an audio/video signal.

In some embodiments, the Ethernet conversion unit may include a connector termination and an integrated circuit chip, and the connector termination may be mounted on a first side of a printed circuit board and the wire connection contacts may be mounted on an opposite side of the printed circuit board.

Pursuant to further embodiments of the present invention, multimedia faceplates are provided that include a frame having front and rear faces and at least first through third connector mounting apertures therein. A video connector is mounted in the first connector mounting aperture, a first Ethernet conversion unit is mounted on at least one of the frame or the video connector and is electrically connected to the video connector, and a first set of wire connection contacts are electrically connected to the first Ethernet conversion unit. An audio connector is mounted in the second connector mounting aperture, a second Ethernet conversion unit is mounted on at least one of the frame or the audio connector and is electrically connected to the audio connector, and a second set of wire connection contacts are electrically connected to the second Ethernet conversion unit. An RJ-45 jack is mounted in the third connector mounting aperture. The first and second Ethernet conversion units are configured to draw an electrical power signal from either an AC to DC power conversion unit or from one or more Power-over-Ethernet power signals.

In some embodiments, the first Ethernet conversion unit may be configured to convert a multimedia signal that is received from a mating connector that is connected to the video connector into a signal that can be routed by an Ethernet switch. The first Ethernet conversion unit may also be configured to convert a packet-based video-over-Ethernet protocol that is received from an Ethernet cable that is connected to the first set of wire connection contacts into a video signal or an audio/video signal having the signal format associated with the video connector. The multimedia faceplate may further include a printed circuit board, and the first Ethernet conversion unit and the first set of wire connection contacts may be mounted on the printed circuit board.

In some embodiments, the second Ethernet conversion unit may be configured to convert a multimedia signal that is received from a mating connector that is connected to the audio connector into a signal that can be routed by an Ethernet switch. The second Ethernet conversion unit may also be configured to convert a packet-based audio-over-Ethernet protocol that is received from an Ethernet cable that is connected to the second set of wire connection contacts into an audio signal having the signal format associated with the audio connector. The multimedia faceplate may further include a printed circuit board, and the second Ethernet conversion unit and the second set of wire connection contacts may be mounted on the printed circuit board.

BRIEF DESCRIPTION OF THE DRAWINGS

FIG. 1 is a schematic diagram illustrating how RJ-45 plugs and jacks and Ethernet cabling may be used to connect an electronic device to network equipment located in a remote location.

FIGS. 2A-2B are schematic front and rear views, respectively, of a multimedia faceplate according to embodiments of the present invention.

DETAILED DESCRIPTION

Figure 3A:
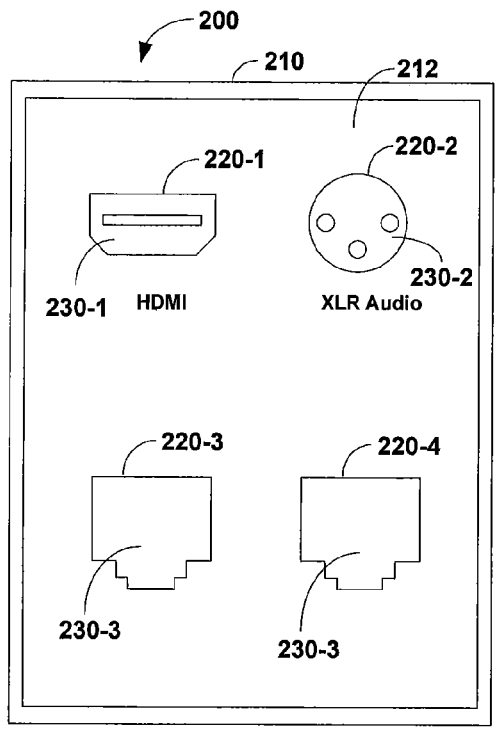
FIG. 3A is a schematic front view of a multimedia faceplate according to further embodiments of the present invention that includes an HDMI connector, an audio connector and two RJ-45 jacks.

As noted above, some buildings may be wired with Ethernet cabling and with one or more additional types of cabling such as video, audio and/or audio/video cabling. The need for multiple different types of cabling is particularly prevalent in educational environments (e.g., schools, college campuses) and in hospitality venues (e.g., restaurants, stadiums, etc.) where audio and/or video content may be broadcast to multiple devices or transmitted from a first device to a second device.

Unfortunately, a number of problems may arise when a building is wired with multiple different types of cables, the foremost of which is increased cost. Aside from the cost of the extra cabling, it is often necessary to have different contractors wire the building with the different types of cables. As such, each contractor may need to perform "cable pulls" to install cabling to the receptacles in the rooms throughout the building instead of having a single contractor pull all of the cables to each receptacle in a single pull. Additionally, different types of cables are not necessarily designed to be bundled together, and hence there is a risk that bundles of multiple different types of cabling in cable conduits or passageways through the walls and/or ceiling of a building may experience performance issues due to heat, crosstalk or other issues. Moreover, some types of cabling (e.g., HDMI cables) may be more expensive than other types of cabling, and hence wiring a building with these types of cables may increase the overall cost.

Pursuant to embodiments of the present invention, multimedia faceplates are provided that include one or more Ethernet conversion units that may be used to convert video, audio and/or audio/video signals into formats that are suitable for transmission over Ethernet cabling. Herein, the term "Ethernet conversion unit" refers to circuitry that is configured to convert a multimedia signal into a format that is suitable for transmission over Ethernet cables and that can be routed by network switches. One or more different types of non-Ethernet connectors such as, for example, HDMI connectors or XLR audio connectors may be mounted in these multimedia faceplates. Herein, the term "non-Ethernet connector" is used to broadly refer to any type of multimedia connector that is not designed to operate with Ethernet cabling. The Ethernet conversion units may be mounted, for example, on a printed circuit board that is installed on the back side of the multimedia faceplate. The printed circuit board may include one or more sets of eight wire connection terminals so that one or more Ethernet cables may be terminated onto the printed circuit board. Alternatively, the wire connection terminals may be integrated into the Ethernet conversion unit. In either case, the wire connection terminals allow an Ethernet cable to be electrically connected to each Ethernet conversion unit so that each non-Ethernet connector is effectively terminated with an Ethernet cable. Each Ethernet conversion unit may convert signals between a first signal format (e.g., HDMI, VGA, etc.) and a format that is suitable for transmission over Ethernet cabling. One or more RJ-45 jacks, which are designed to operate with Ethernet cabling, may also be mounted in the multimedia faceplates according to embodiments of the present invention.

When the multimedia faceplates according to embodiments of the present invention are used, signals received at each non-Ethernet connector may be converted into a format that is appropriate for transmission over an Ethernet cable and then transmitted over the Ethernet cable that is coupled to the non-Ethernet connector to, for example, a central location where it can be routed to an appropriate destination via, for example, a network switch. Thus, the multimedia faceplates according to embodiments of the present invention provide a mechanism for distributing audio and/or video signals from non-Ethernet compatible electronic devices over Ethernet cabling. The network switch may route these audio and/or video signals to other electronic devices such as speakers or video monitors that are connected to other receptacles in the building. In some cases, the speakers and video monitors may be Ethernet-enabled devices that are connected to the wired in-building communications system via Ethernet patch cords and, in such cases, the audio and/or video signals are delivered from the multimedia faceplate to these devices solely over Ethernet cabling. In other cases, the speakers and/or video monitors may be connected to a second multimedia faceplate according to embodiments of the present invention and the signals may be converted at this second multimedia faceplate back into their native format (e.g., to an HDMI or XLR audio signal) and routed to the electronic device over a multimedia patch cord.

Example embodiments of the present invention will now be discussed in more detail with reference to the attached drawings.

FIGS. 2A-2B are schematic front and rear views of a multimedia faceplate 100 according to embodiments of the present invention.

As shown in FIG. 2A, the multimedia faceplate 100 comprises a frame 110 that has a front face 112 with a plurality of mounting apertures 120 therein. The frame 110 may be formed of a rigid plastic material and may be conventional in nature. The mounting apertures 120 may be sized to receive different types of connectors including, for example, a mounting aperture 120-1 that is sized to receive a video connector or an audio/video connector, a mounting aperture 120-2 that is sized to receive an audio connector, and mounting apertures 120-3 and 120-4 that are sized to receive RJ-45 jacks. A video or audio/video connector 130-1 may be mounted in the mounting aperture 120-1, an audio connector 130-2 may be mounted in the mounting aperture 120-2, and RJ-45 jacks 130-3 may be mounted in the mounting apertures 120-3 and 120-4. It will be appreciated that any number or combination of mounting apertures 120 may be included in the frame 110, and that an appropriate connector or a cover plate may be mounted at each mounting aperture 120.

The multimedia connector 130-1 may comprise a video or an audio/video connector such as, for example, an HDMI, VGA, SDI and/or S-Video connector. The multimedia connector 130-2 may comprise an audio connector such as, for example, an XLR ¼" audio or ⅛" audio port (balanced or unbalanced, stereo or mono) or a combinatorial connector such as a Neutrik combo connector. In FIG. 2A, connector 130-1 is shown as an HDMI connector as an example. The RJ-45 jacks 130-3 may comprise, for example, Category 5, 5e, 6, 6A, 7 or higher jacks. Such RJ-45 jacks include a backend wire connection assembly 132 that has a plurality of wire connection terminals that are configured to receive the individual insulated conductors of an Ethernet cable.

Referring to FIG. 2B, the connectors 130-1, 130-2, 130-3 may extend rearwardly from the back face 114 of the frame 110. A first Ethernet conversion unit 140 is provided that may convert signals input to the video connector 130-1 into a format suitable for transmission over Ethernet cabling such as, for example, into a signal having a packet-based video-over-Ethernet protocol. An example of signals that have a packet-based video-over-Ethernet protocol are HD Base T signals. A second Ethernet conversion unit 150 is provided that may convert signals input to the audio connector 130-2 into a format suitable for transmission over Ethernet cabling such as, for example, Dante™ signals (or to another signal having a packet-based audio-over-Ethernet protocol). Dante™ is an audio-over-Ethernet protocol for audio transport developed by Audinate®. The first and second Ethernet conversion units 140, 150 may include integrated sets of wire connection terminals 170-1, 170-2, respectively, or may be connected to respective stand alone sets of wire connection terminals 170-1, 170-2. Each set of wire connection terminals 170-1, 170-2 may be used to electrically connect an Ethernet cable to the respective first and second Ethernet conversion units 140, 150. Each set of wire connection contacts 170-1, 170-2 may comprise, for example, a set of eight insulation displacement contacts ("IDCs").

The first Ethernet conversion unit 140 may be configured to convert signals that are received by multimedia connector 130-1 from a multimedia cable that is plugged into the multimedia connector 130-1 into packet-based data that is suitable for transmission over the Ethernet cable that is electrically connected to the first Ethernet conversion unit 140 via the first set of wire connection terminals 170-1. The first Ethernet conversion unit 140 may also be configured to convert packet-based video-over-Ethernet protocol signals that are received from an Ethernet cable that is connected to the wire connection terminals 170-1 into an appropriate multimedia format (e.g., HDMI). The first Ethernet conversion unit 140 may contain circuitry that converts either a video signal or an audio/video signal into a signal having a packet-based video-over-Ethernet protocol such as an HD Base T signal, and vice versa. The first Ethernet conversion unit 140 may be implemented, for example, as an integrated circuit chip, a plurality of integrated circuit chips or as discrete components. In some embodiments, the Ethernet conversion unit 140 may be configured to convert between one specific type of video or audio/video signal and a signal format that is suitable for transmission over Ethernet cabling (e.g., HD Base T) and vice versa. Thus, a plurality of different Ethernet conversion units 140 may be available that are configured to work with different type audio/video and/or video signals such as HDMI, VGA, SDI and S-Video signals, and the appropriate one of these Ethernet conversion units 140 may be included in the multimedia faceplate 100 based on the type of audio/video or video connector 130-1 that is mounted in the faceplate 100.

The second Ethernet conversion unit 150 is configured to convert signals that are received by multimedia connector 130-2 from a multimedia cable that is plugged into the multimedia connector 130-2 into packet-based data that is suitable for transmission over Ethernet cabling. The second Ethernet conversion unit 150 will contain circuitry that converts an audio signal into a signal having a packet-based audio-over-Ethernet protocol such as, for example, a Dante™ signal, and vice versa. The second Ethernet conversion unit 150 may be implemented, for example, as an integrated circuit chip, a plurality of integrated circuit chips or as discrete components. The output of the second Ethernet conversion unit 150 may be coupled to an Ethernet cable via the second set of wire connection terminals 170-2. The second Ethernet conversion unit 150 may also be configured to convert packet-based video-over-Ethernet protocol signals that are received from an Ethernet cable that is connected to the wire connection terminals 170-2 into an appropriate multimedia format (e.g., XLR audio signals). In some embodiments, the second Ethernet conversion unit 150 may be configured to convert between one specific type of audio signal and an audio signal format (e.g., Dante™) that is suitable for transmission over Ethernet cabling. Thus, a plurality of different second Ethernet conversion units 150 may be available that are configured to work with different types of audio signals, and the appropriate one of these Ethernet conversion units 150 may be included in the multimedia faceplate 100 based on the type of audio connector 130-2 that is mounted in the faceplate 100.

One or both of the first and second Ethernet conversion units 140, 150 may comprise active circuits that require an electrical power feed. In some embodiments, the multimedia faceplate 100 may comprise a Power-over-Ethernet ("PoE") device that draws electrical power over one (or more) of the Ethernet cables that are electrically connected to connectors 130 that are included in the multimedia faceplate 100. In such embodiments, the first and second Ethernet conversion units 140, 150 may each include a transformer or other circuit that extracts a direct current power signal that is carried on one or more of the twisted pairs of the Ethernet cable that is coupled to the conversion unit 140, 150 and feeds this DC power signal to, for example, a voltage regulation circuit (not shown separately in FIGS. 2A-2B) in the first and/or second Ethernet conversion units 140, 150. Alternatively, a single transformer may be provided that extracts the direct current power signal from one of the Ethernet cables and feeds this DC power signal to a voltage regulation circuit 180 that supplies a suitable DC operating voltage to both the first and second Ethernet conversion units 140, 150. In still other embodiments, the first and second Ethernet conversion units 140, 150 may be powered by a power converter circuit 182 that draws power from an adjacent electrical outlet. This power converter circuit 182 may, for example, convert a 115 V alternating current ("AC") power signal that is tapped from the electrical outlet into a suitable DC power signal that is used to power the first and second Ethernet conversion units 140, 150. In FIG. 2B, the above-described transformers, voltage regulation circuits and power converter circuits are generically illustrated by a block labeled 180/182.

Figure 3B:
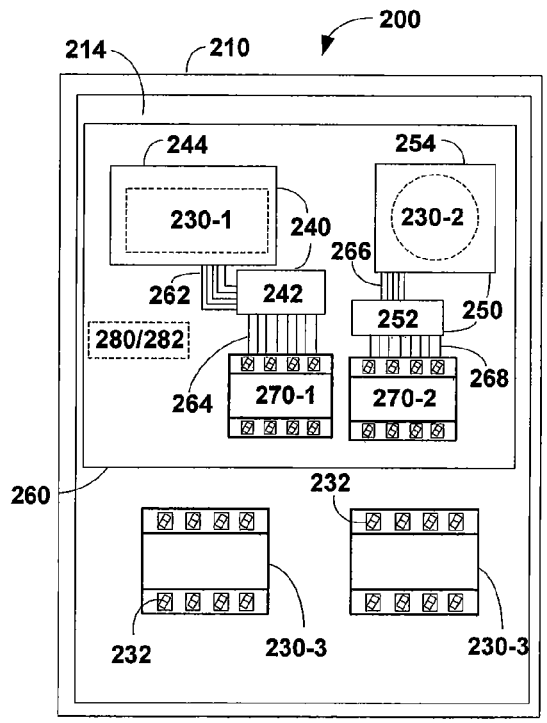
FIG. 3B is a schematic rear view of the multimedia faceplate of FIG. 3A.
Figure 3C:
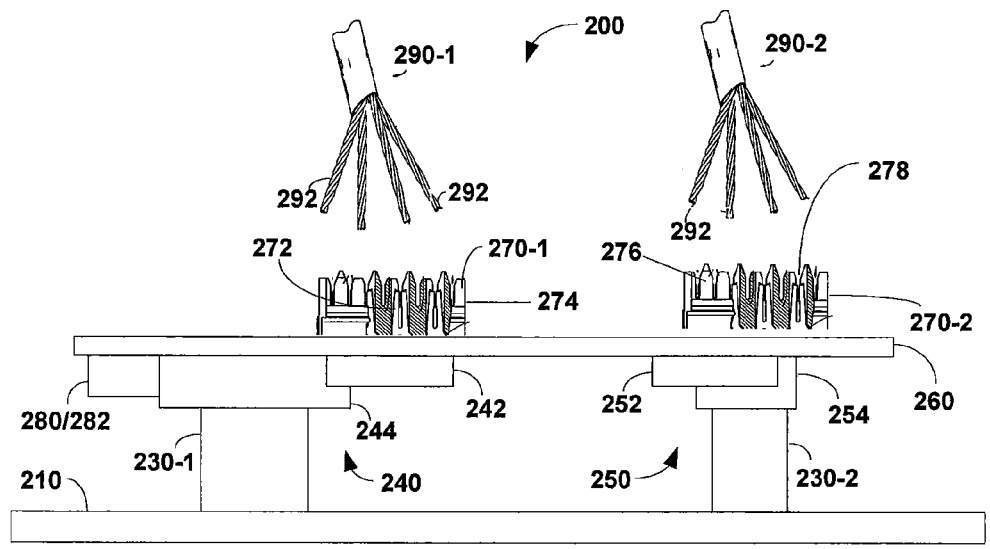
FIG. 3C is a schematic, partially cut-away top view of the multimedia faceplate of FIGS. 3A and 3B.

FIGS. 3A-3C illustrate a multimedia faceplate 200 according to further embodiments of the present invention. In particular, FIG. 3A is a front view of the multimedia faceplate 200, FIG. 3B is a rear view of the multimedia faceplate 200, and FIG. 3C is a top view of the multimedia faceplate 200. In FIG. 3C, the wire connection assemblies 270 are shown in partially cut-away view to illustrate representative ones of the IDCs 272 included therein.

Referring to FIG. 3A, the multimedia faceplate 200 includes a frame 210 that has a front face 212 with four mounting apertures 220-1 through 220-4 therein. Mounting aperture 220-1 is sized to receive an HDMI connector 230-1, mounting aperture 220-2 is sized to receive an XLR audio connector 230-2, and mounting apertures 220-3 and 220-4 are each sized to receive an RJ-45 jack 230-3. The connectors 230 are mounted in their respective apertures 220, as shown in FIGS. 3A and 3B.

Each RJ-45 outlet 230-3 has a back-end wire connection assembly 232, which includes eight IDCs (not visible in FIG. 3B). Ethernet cables (not shown in FIG. 3B) that each have four twisted pairs of insulated conductors may be terminated into the back end wire connection assembly 232 of each RJ-45 jack 230-3 by inserting each of the eight insulated conductors into the respective IDCs of the wire connection assembly 232 of each RJ-45 jack 230-3.

Referring to FIGS. 3B and 3C, a printed circuit board 260 is mounted on the rear face 214 of the frame 210. A first Ethernet conversion unit 240 is mounted on the front face of the printed circuit board 260. The first Ethernet conversion unit 240 is configured to convert HDMI signals that are received at the HDMI connector 230-1 into packet switched HD Base T signals that are suitable for transmission over an Ethernet cable, and to convert HD Base T signals that are received over the Ethernet cable into HDMI signals that may be passed to the HDMI connector 230-1. As shown best in FIGS. 3B and 3C, the first Ethernet conversion unit 240 comprises an integrated circuit chip 242 and a connector termination 244 that are both mounted on the printed circuit board 260. The connector termination 244 is configured to receive a back end of the HDMI connector 230-1 and to electrically connect the contacts thereof to corresponding conductive traces 262 on the printed circuit board 260. The conductive traces 262 serve as a communications path for transmitting signals between the integrated circuit chip 242 and the HDMI connector 230-1. The integrated circuit chip 242 includes circuitry that is configured to transform HDMI signals received on the traces 262 into HD Base T packet based signals, and to transform HD Base T signals that are received over an Ethernet cable into HDMI signals that are forwarded via the traces 262 and the connector termination 244 to the HDMI connector 230-1.

The integrated circuit chip 242 includes eight input/output pins that are connected to corresponding traces 264 on the printed circuit board 260. As shown best in FIG. 3C, the printed circuit board 260 further includes a first wire connection assembly 270-1, which includes eight IDCs 272 that are mounted in one or more dielectric blocks 274. The dielectric block(s) may include pillars 276 that have slits 278 at their distal ends that provide access to the IDCs 272. An Ethernet cable 290-1 that has four pairs of insulated conductors 292 may be terminated into the wire connection assembly 270-1. The traces 264 electrically connect the conductors 292 of the Ethernet cable 290-1 to the respective eight input/output pins on the integrated circuit chip 242.

Thus, as shown in FIGS. 3A-3C, the first Ethernet conversion unit 240 may be used to electrically connect the HDMI connector 230-1 to a first Ethernet cable 290-1 and to convert signals between an HDMI format that is suitable for transmission through the HDMI connector to an HD Base T format that is suitable for transmission over the Ethernet cable 290-1.

As is further shown in FIGS. 3B and 3C, a second Ethernet conversion unit 250 is also mounted on the front face of the printed circuit board 260. The second Ethernet conversion unit 250 is configured to convert XLR audio signals that are received at the XLR audio connector 230-2 into Dante™ signals that are suitable for transmission over an Ethernet cable, and to convert Dante™ signals that are received over the Ethernet cable into XLR audio signals that may be passed through the XLR audio connector 230-2. The second Ethernet conversion unit 250 comprises an integrated circuit chip 252 and a connector termination 254 that are mounted on the printed circuit board 260. The connector termination 254 is configured to receive a back end of the XLR audio connector 230-2 and to electrically connect the contacts thereof to corresponding conductive traces 266 on the printed circuit board 260. The conductive traces 266 serve as a communications path for transmitting signals between the integrated circuit chip 252 and the XLR audio connector 230-2.

The integrated circuit chip 252 includes eight input/output pins that are connected to corresponding traces 268 on the printed circuit board 260 (note, in some cases less than eight output lines and traces may be required). The printed circuit board 260 further includes a second wire connection assembly 270-2 which includes eight IDCs 272 that are mounted in a dielectric block 274. The conductors 292 of a second Ethernet cable 290-2 may be terminated into the wire connection assembly 270-2. The traces 268 electrically connect the conductors 292 of the second Ethernet cable 290-2 to the respective eight input/output pins on the integrated circuit chip 252.

Thus, the second Ethernet conversion unit 250 may be used to electrically connect the XLR audio connector 230-2 to the second Ethernet cable 290-2 and to convert signals between an XLR audio format that is suitable for transmission through the XLR audio connector to a Dante™ format that is suitable for transmission over the second Ethernet cable 290-2.

Referring to FIGS. 3B and 3C, in some embodiments, a power conversion unit 282 may also be mounted on the printed circuit board 260 or elsewhere on the multimedia faceplate 200. A pair of electrical conductors (not shown) such as insulated copper wires may be used to draw an AC power signal from, for example, a power outlet that is adjacent to the multimedia faceplate 200. The power conversion unit 282 may be used to convert the AC power signal into a DC power signal having a voltage that is suitable for powering the first and second Ethernet conversion units 240, 250.

In other embodiments, the power conversion unit 282 may be omitted and the first and second Ethernet conversion units 240, 250 may be powered via a PoE signal that is received over one of the Ethernet cables (not shown) that are terminated into the connectors 230 mounted in the faceplate 200. Any appropriate Power-over-Ethernet format may be used. A transformer 280 may, for example, be mounted on the printed circuit board 260 and used to extract the DC power signal from the Ethernet cable for purposes of powering the first and second Ethernet conversion units 240, 250.

In the embodiment of FIGS. 3A-3C, the first and second Ethernet conversion units 240, 250 are mounted onto the respective first and second multimedia connectors 230-1, 230-2, and are further mounted to the printed circuit board 260, thereby attaching the printed circuit board 260 to the frame 210. In other embodiments, the printed circuit board 260 may be directly mounted to the frame 210 or may be mounted to the frame 210 by separate supports.

The multimedia faceplate 200 may be used to transmit multimedia signals over Ethernet cabling, thereby reducing or avoiding altogether the need to wire buildings with multiple types of communications cables.

The multimedia faceplates according to embodiments of the present invention may be used in any environment in which there is a need to transmit multimedia signals in a building that is wired with Ethernet cabling. As one simple example, in many university classrooms, a professor may display slides on a screen using a projector, use a microphone to amplify his or her voice, and there may also be a camera that is trained on the professor that captures a video recording of the lecture which is transmitted to other locations such as overflow or offsite classrooms. The microphone (if a wired microphone) or a base unit for the microphone (if the microphone is wireless) may be plugged into an audio port 230-2 on the multimedia faceplate 200. The output of the video camera may be plugged into the video port 230-1 on the multimedia faceplate 200. An output of the projector may be connected to one of the RJ-45 jacks 230-3 in the multimedia faceplate 200.

The multimedia faceplate 200 converts the output of the microphone into a Dante© signal and converts the video signal output by the video camera into an HD Base T signal. These signals, along with an Ethernet signal output by the projector to one of the RJ-45 jacks on the multimedia faceplate 200, are then transmitted over the Ethernet cables 290 that are terminated into the rear side of the multimedia faceplate 200 to, for example a network closet located elsewhere in the building. The network closet contains equipment which transmits the audio, video and Ethernet signals to selected connectors of additional multimedia faceplates 200 that are mounted in receptacles within the building and/or to remote locations. Speakers, a video monitor and a projector that are connected to respective audio, video and RJ-45 connectors on these additional multimedia faceplates 200 may be driven directly by the Dante™, HD Base T and Ethernet signals to present the lecture in the remote classroom or offsite location or, alternatively, may be converted back to their native formats before being forwarded to the end devices over multimedia patch cords.

It will be appreciated that numerous modifications may be made to the multimedia faceplates that are described and pictured herein without departing from the scope of the present invention. For example, while the embodiment of FIGS. 3A-3C includes a single printed circuit board 260 that includes the wire connection terminals 270 for multiple multimedia connectors 230, it will be appreciated that in other embodiments each multimedia connector 230 may have its own individual printed circuit board. For example, FIG. 4 is a top view of a multimedia faceplate 200' according to further embodiments of the present invention that includes such a configuration.

Figure 4:
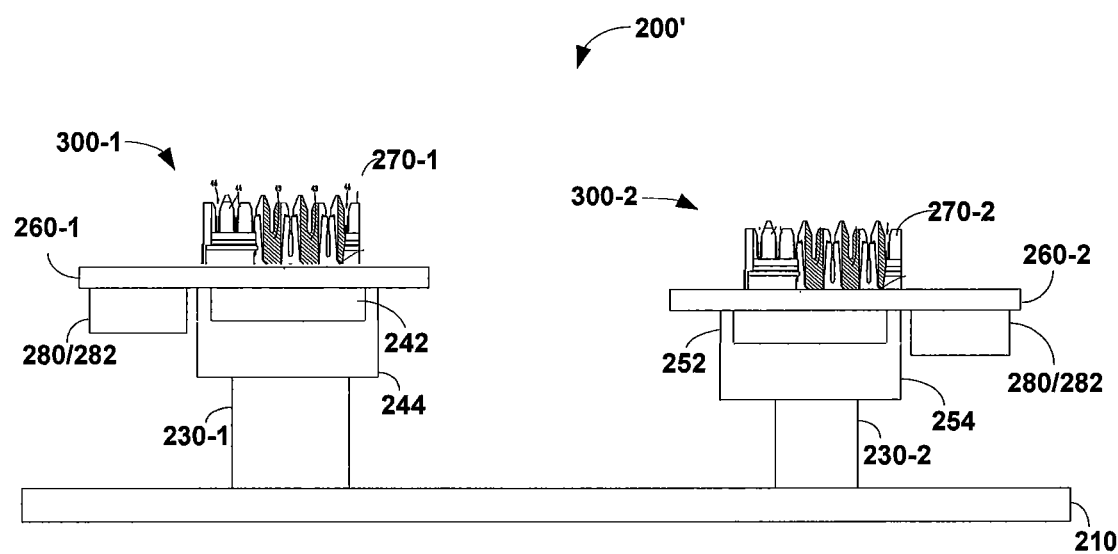
FIG. 4 is a schematic top view of a multimedia faceplate according to further embodiments of the present invention.

As shown in FIG. 4, the multimedia faceplate 200' may be very similar to the multimedia faceplate 200 that is discussed above with reference to FIGS. 3A-3C. However, the multimedia faceplate 200' includes two separate printed circuit boards 260-1, 260-2 (i.e., a printed circuit board 260-1, 260-2 for each multimedia connector 230) as opposed to a single printed circuit board 260. Additionally, in the multimedia faceplate 200' of FIG. 4, each Ethernet conversion unit 240, 250 is combined with an individual printed circuit board 260-1, 260-2 and with a set of wire connection terminals 270 to provide an integrated converter 300-1, 300-2 for each multimedia connector 230. Each integrated converter 300-1, 300-2 may be mounted on the back end of a respective multimedia connector 230-1, 230-2. In some cases, the converters 300-1, 300-2 may be field mounted on the respective multimedia connectors 230-1, 230-2. A power conversion unit 280 and/or a transformer 282 may also be included on the printed circuit boards 260-1, 260-2 of the respective converters 300-1, 300-2.

In the multimedia faceplates according to embodiments of the present invention, circuitry may be provided at each multimedia connector that is configured to convert a multimedia signal into a signal having a packetized protocol that is suitable for transmission over an Ethernet cable and circuitry that is configured to convert a signal having a packetized protocol that is received over an Ethernet cable into a multimedia signal. Alternatively, circuitry may be provided at each multimedia connector that only performs one of the two above-mentioned conversions (e.g., circuitry is provided that is configured to convert a multimedia signal into a signal having a packetized protocol that is suitable for transmission over an Ethernet cable, but no circuitry is provided for converting signals flowing in the reverse direction). In still other embodiments, circuitry may be provided that may selectively perform conversions in one or both directions.

It will be appreciated that some packet-based audio protocols, such as Dante™, are designed so that signals having such protocols can be directly routed by Ethernet switches. Currently HD Base T signals cannot be directly switched by a regular Ethernet switch, although this capability may be added in the future. HD Base T hardware is available that may be used to route HD Base T signals.

The multimedia faceplates according to embodiments of the present invention may provide a number of advantages. As noted above, by converting audio, video and or audio/video signals into signals that are suitable for transmission over Ethernet cabling the need to wire a building with different types of communications cables may be reduced or eliminated. Additionally, the multimedia faceplates according to embodiments of the present invention may be used to convert audio, video and or audio/video signals into signals that are suitable for direct input into audio, video and/or audio/video output devices such as speakers, televisions, computers, projectors, etc. The multimedia faceplates may, in some embodiments, be powered using PoE DC power signals, thereby eliminating any need to separately wire electrical power to the multimedia faceplate. Moreover, with the multimedia faceplates according to embodiments of the present invention, the Ethernet cables may be terminated directly to wire connection terminals that are part of the faceplate, which may simplify installation.

While the present invention is described above with reference to drawings that illustrate preferred embodiments thereof, it will be appreciated that the present invention may be embodied in many different forms and should not be construed as limited to the embodiments set forth herein. Instead, these embodiments are provided so that this disclosure will be thorough and complete, and will fully convey the scope of the invention to those skilled in the art.

In the drawings, the size of lines and elements may be exaggerated for clarity. It will also be understood that when an element is referred to as being "coupled" to another element, it can be coupled directly to the other element, or intervening elements may also be present. In contrast, when an element is referred to as being "directly coupled" to another element, there are no intervening elements present. Likewise, it will be understood that when an element is referred to as being "connected" or "attached" to another element, it can be directly connected or attached to the other element or intervening elements may also be present. In contrast, when an element is referred to as being "directly connected" or "directly attached" to another element, there are no intervening elements present.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. As used herein, the term "and/or" includes any and all combinations of one or more of the associated listed items.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A multimedia faceplate, comprising:
   a frame having a front face and a rear face and at least one connector mounting aperture therein;
   a non-Ethernet connector mounted in the connector mounting aperture;
   an Ethernet conversion unit that is mounted on at least one of the frame or the non-Ethernet connector, the Ethernet conversion unit electrically connected to the non-Ethernet connector; and
   a plurality of wire connection contacts that are electrically connected to the Ethernet conversion unit;
   wherein the Ethernet conversion unit is configured to draw an electrical power signal from either an AC to DC power conversion unit or from a Power-over-Ethernet power signal received from an Ethernet cable that is connected to the wire connection contacts.

2. The multimedia faceplate of claim 1, further comprising a printed circuit board, wherein the Ethernet conversion unit is mounted on the printed circuit board and wherein the plurality of wire connection contacts are also mounted on the printed circuit board.

3. The multimedia faceplate of claim 2, wherein the Ethernet conversion unit includes a connector termination and an integrated circuit chip, and wherein the connector termination is mounted on a first side of the printed circuit board and the wire connection contacts are mounted on an opposite side of the printed circuit board.

4. The multimedia faceplate of claim 1, wherein the Ethernet conversion unit is configured to convert a multimedia signal into a signal that can directly drive a multimedia output device.

5. The multimedia faceplate of claim 1, wherein the Ethernet conversion unit is configured to convert a video signal or an audio/video signal into a signal having a packet-based video-over-Ethernet protocol.

6. The multimedia faceplate of claim 1, wherein the Ethernet conversion unit is configured to convert an audio signal into a signal having a packet-based audio-over-Ethernet protocol.

7. The multimedia faceplate of claim 1, wherein the Ethernet conversion unit is mounted directly on the non-Ethernet connector.

8. The multimedia faceplate of claim 1, further comprising an Ethernet connector mounted in a second connector mounting aperture in the frame.

9. The multimedia faceplate of claim 1, further comprising a printed circuit board that is mounted on at least one of the frame, the non-Ethernet connector, or another connector that is mounted in a second mounting aperture in the frame.

10. The multimedia faceplate of claim 1, wherein the Ethernet conversion unit is configured to convert a multimedia signal into a signal that can be routed by an Ethernet switch.

11. The multimedia faceplate of claim 1, wherein the Ethernet conversion unit is further configured to convert a packet-based video-over-Ethernet protocol into a video signal or an audio/video signal.

12. A multimedia faceplate, comprising:
    a frame having a front face and a rear face and at least first through third connector mounting apertures therein;
    a video connector mounted in the first connector mounting aperture;

a first Ethernet conversion unit that is mounted on at least one of the frame or the video connector, the first Ethernet conversion unit electrically connected to the video connector; and a first set of wire connection contacts that are electrically connected to the first Ethernet conversion unit;

an audio connector mounted in the second connector mounting aperture;

a second Ethernet conversion unit that is mounted on at least one of the frame or the audio connector, the second Ethernet conversion unit electrically connected to the audio connector;

a second set of wire connection contacts that are electrically connected to the second Ethernet conversion unit; and an RJ-45 jack mounted in the third connector mounting aperture, wherein the first and second Ethernet conversion units are configured to draw an electrical power signal from either an AC to DC power conversion unit or from one or more Power-over-Ethernet power signals.

13. The multimedia faceplate of claim 12, wherein the first Ethernet conversion unit is configured to convert a multimedia signal that is received from a mating connector that is connected to the video connector into a signal that can be routed by an Ethernet switch.

14. The multimedia faceplate of claim 13, wherein the first Ethernet conversion unit is configured to convert a packet-based video-over-Ethernet protocol that is received from an Ethernet cable that is connected to the first set of wire connection contacts into a video signal or an audio/video signal having the signal format associated with the video connector.

15. The multimedia faceplate of claim 14, further comprising a printed circuit board, wherein the first Ethernet conversion unit is mounted on the printed circuit board and wherein the first set of wire connection contacts are also mounted on the printed circuit board.

16. The multimedia faceplate of claim 12, wherein the second Ethernet conversion unit is configured to convert a multimedia signal that is received from a mating connector that is connected to the audio connector into a signal that can be routed by an Ethernet switch.

17. The multimedia faceplate of claim 16, wherein the second Ethernet conversion unit is configured to convert a packet-based audio-over-Ethernet protocol that is received from an Ethernet cable that is connected to the second set of wire connection contacts into an audio signal having the signal format associated with the audio connector.

18. The multimedia faceplate of claim 17, further comprising a printed circuit board, wherein the second Ethernet conversion unit is mounted on the printed circuit board and wherein the second set of wire connection contacts are also mounted on the printed circuit board.

19. The multimedia faceplate of claim 12, wherein the first Ethernet conversion unit is mounted directly on the video connector and the second Ethernet conversion unit is mounted directly on the audio connector.

20. The multimedia faceplate of claim 12, further comprising a printed circuit board, wherein the first Ethernet conversion unit includes a connector termination and an integrated circuit chip, and wherein the connector termination is mounted on a first side of the printed circuit board and the first set of wire connection contacts is mounted on an opposite side of the printed circuit board.

* * * * *